Sept. 13, 1960 F. J. RENNER ET AL 2,952,202
APPARATUS FOR MAKING COFFEE
Filed March 5, 1956 2 Sheets-Sheet 1

Inventors:
Frank J. Renner
George B. Renner
William M. Renner
By: Zahl, Baker, York,
Jones & Dithmar
Attorneys Sept. 13, 1960  F. J. RENNER ET AL  2,952,202
APPARATUS FOR MAKING COFFEE
Filed March 5, 1956  2 Sheets-Sheet 2
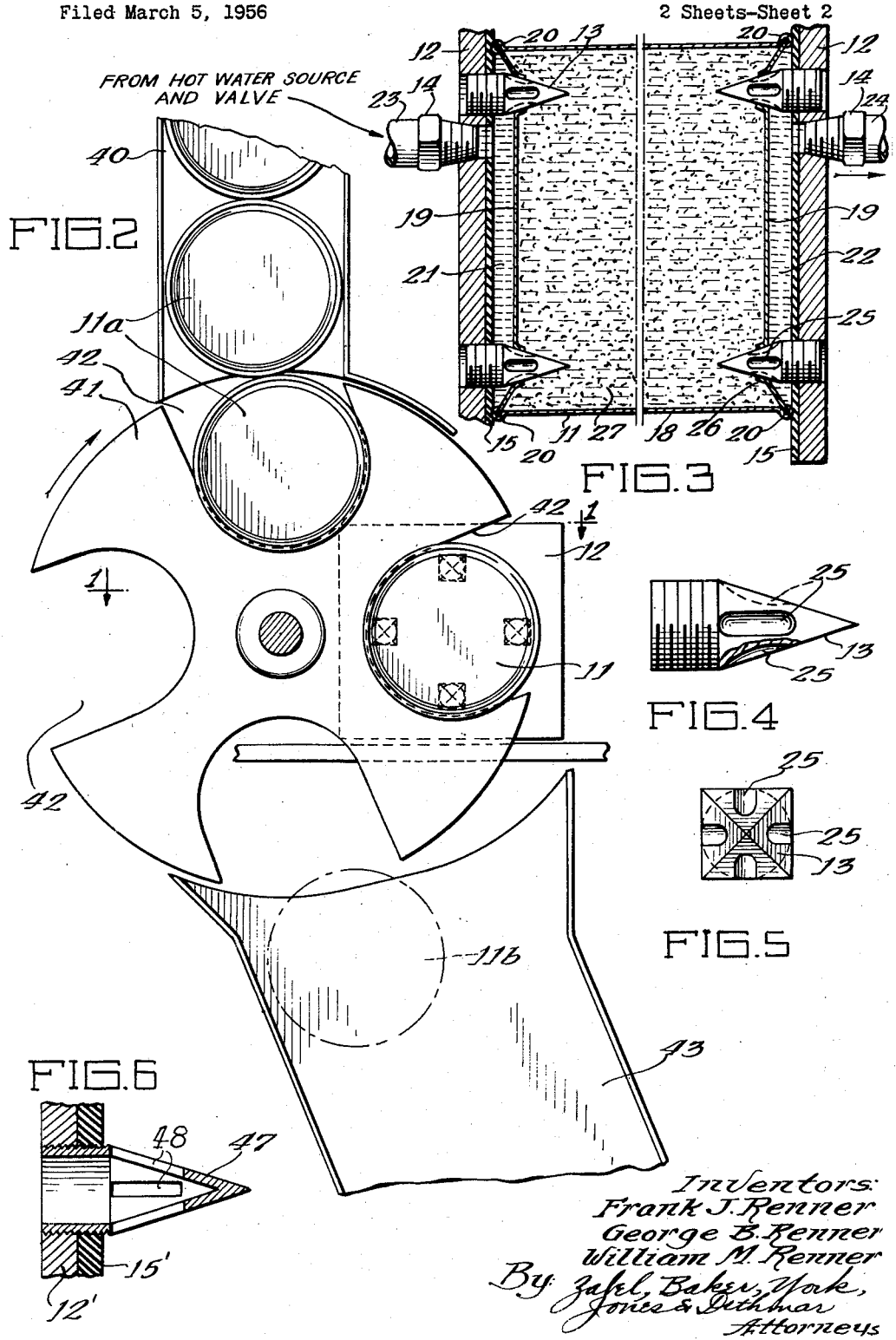

United States Patent Office 2,952,202
Patented Sept. 13, 1960

2,952,202
APPARATUS FOR MAKING COFFEE
Frank J. Renner, 6 W. Fairview, Arlington Heights, Ill.; George B. Renner, 211 Olive St., Prospect Heights, Ill.; and William M. Renner, 5122 N. Natoma St., Chicago, Ill.
Filed Mar. 5, 1956, Ser. No. 569,588
8 Claims. (Cl. 99—289)

The present invention relates to an improved apparatus for making coffee and similar infusions.

It is an object of the present invention to provide an improved coffee brewing method in which the coffee solubles are extracted from ground coffee while the ground coffee is still contained within the container in which it is originally packed.

Heretofore a coffee infusion has been made by placing the ground coffee in a bag, or in a cartridge, and then causing hot water to pass through the ground coffee while it is contained within the bag or the cartridge. This prior art process necessarily includes the steps of opening the container in which the coffee is originally packed, and transferring the contents from the said container to the bag or cartridge, and it also necessarily includes the steps of removing the spent coffee grounds from the bag or cartridge, disposing of the same, and cleaning out the bag or cartridge.

According to the present invention, the last-named steps are eliminated since the extraction takes place in the original container, and the problem of grounds disposal is merely one of disposing of the original container.

The present invention is particularly applicable to commercial coffee makers, of the type used in restaurants, and to automatic coffee vending machines. However, its utility is not limited to such apparatus since one of the characteristics of the present invention is that the coffee is extracted immediately after the container seal is broken, thus providing freshly brewed coffee. Thus, according to the present invention, freshly brewed coffee may be provided for either commercial or domestic purposes.

The present invention is described with reference to its application in a device similar to that shown in Renner Patent No. 2,702,000 dated February 15, 1955, in which the water is pre-heated to the desired temperature, and then forced through the extractor and into a reservoir by the pressure of the water main, or water supply system. In this connection, the invention is described with respect to a coffee making device in which the coffee containers are automatically fed into the extracting station, and in which extraction and ejection of the spent container is effected automatically.

Another object of the present invention is to provide coffee making apparatus which is capable of automatically making successive batches of freshly brewed coffee.

Still another object of the present invention is to provide improved extraction apparatus in which the original coffee container serves the purpose of the extractor cartridge.

According to the preferred embodiment shown, the end walls of the original coffee container are first perforated, a predetermined quantity of hot water is then forced through the container and into the reservoir, and then the spent container is automatically discarded.

It is another object of the present invention to provide improved apparatus for performing the two functions of perforating the end walls of a coffee container or the like, and for providing a water-tight seal between the perforating means and the container itself, to the end that the container becomes a part of the fluid circuit.

According to one embodiment of the invention, an end wall of the coffee container is utilized to provide a portion of the header chamber and the bead of the container is utilized for providing a water-tight seal between those portions of the header chamber which constitute the can itself and those portions which constitute the apparatus.

Other objects, features and advantages will become apparent as the description proceeds.

With reference now to the drawings in which like reference numerals designate like parts:

Fig. 2 is an elevation of the container feed which is associated with the extractor, the view being taken substantially along line 2—2 of Fig. 1;

Fig. 3 is a detailed plan section of certain of the parts shown in Fig. 1, showing said parts in a changed position;

Fig. 4 is a detailed view of a perforating pin;

Fig. 5 is an end view of Fig. 4; and

Fig. 6 is a section of a modified form of perforating pin.

Figure 1:
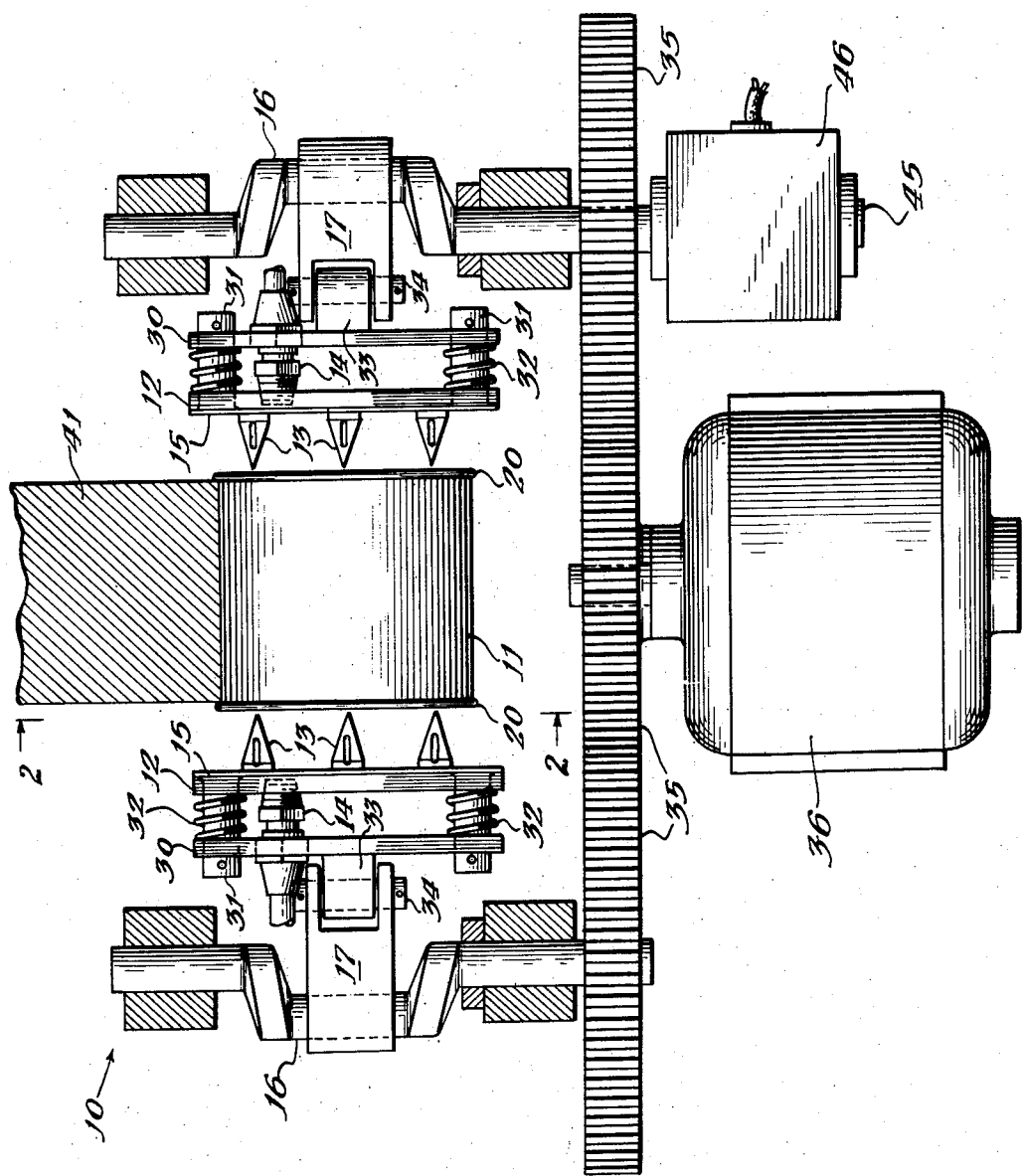
Fig. 1 is a plan view of an extractor illustrating our invention, and embodying certain features thereof, the view being taken generally along line 1—1 of Fig. 2.

The present invention contemplates the provision of a fluid circuit including a source of fluid pressure, such as a water main, a water heater, an extractor 10, and a coffee reservoir, all as described in the aforesaid Patent No. 2,702,000, to which reference is hereby made. These elements are connected in series circuit with each other, only the extractor 10 being shown herein.

With reference now to Fig. 1, the extractor 10 comprises a coffee container 11, plates 12 and suitable actuating mechanism. Mounted on each of the plates 12 are one or more perforating pins 13, a nipple 14 and a gasket 15. The actuating mechanism includes cranks 16 and connecting rods 17.

The coffee container 11 is a standard type of metal container in which coffee is commercially packed for sale, preferably of the sealed or "vacuum type" of can. The container 10 is provided with the usual cylindrical side wall 18 and with end walls 19 and such a container is characterized by the provision of a bead 20 which surrounds each end wall 19 and projects slightly beyond the average plane of the end wall, as shown in Fig. 3.

In operation, when a container 11 is located between the plates 12 in the manner shown in Fig. 1, and the cranks 16 are rotated, the plates 12 will move toward the end walls of the container, and the latter will be pierced by the perforating pins 13. Means are provided to include the interior of the container in the fluid circuit aforementioned so that the soluble coffee may be extracted from the coffee grounds disposed within the container.

According to the embodiment shown in Fig. 3, such means include the provision of an inlet header chamber 21, and an outlet header chamber 22. Each header chamber is defined by the plate 12, or its overlying gasket 15, and by the end wall 19 and by the bead 20. Thus, part of the header chamber is provided by the mechanism itself, and part by the container, or work which is operated upon. The two header chambers are connected into the fluid circuit by means of a flexible inlet conduit 23 which is attached to one of the nipples 14 and which leads from the water heater, and by a flexible outlet conduit 24 attached to the other nipple 14, and which leads to the coffee reservoir.

The perforating pins 13, as shown in Figs. 4 and 5, are provided with recesses 25 in the perforating surfaces thereof. In the arrangement shown, the perforating surfaces are pyramidal in arrangement, and the recesses 25 are ground, one in each of the plane surfaces.

As the plates 12 move into engagement with the container 11, the beads 20 cooperate with the resilient gaskets 15 to provide water tight seals for the respective chambers. A suitable valve, not shown, is located in the inlet conduit 23, between the nipple 14 and the water heater, and this is opened to cause hot water to flow in the fluid circuit which includes the header chamber 21, the interior of the container 11, the header chamber 22, and thence through the outlet conduit 24 to the reservoir. The recesses 25 provide a small clearance between the perforated end wall 19 and the body of the perforating pins 13 to provide communication between each header chamber and the interior of the container 11. The cross sectional dimensions of the communicating passageway thus formed is thus smaller than the average grain size of the coffee grounds 27 so that the passageway serves as a filter. The perforating operation also provides extrusions 26 as shown in Fig. 3, which also contribute to the filtering action.

Thus, the ground coffee 27 may be extracted without moving the same from the container 11, in order to provide freshly brewed coffee. At the same time, the steps of filling a special bag or cartridge, and the steps of cleaning out the same and ground disposal are at the same time eliminated.

The valve is actuated in such a manner that only a predetermined quantity of water flows through the container 11. After the valve is again closed, the cranks 16 rotate to withdraw the plates 12 from the container 11, and the container may then be disposed of.

As shown in Fig. 1, the plates 12 are mounted on backing plates 30 by means of suitable guide pins 31 and are urged toward the can by means of spring 32 which surround the guide pins 31. The nipples 14 and their associated parts are loosely received within suitable openings formed in the backing plates 30 so as not to impede free relative movement of the backing plates 30 and the perforating plates 12. The backing plates 30 are provided with lugs 33 which are connected by suitable pins 34 to the connecting rods 17.

This resilient mounting of perforating plates 12 on backing plates 30 permits unidirectional rotation of the cranks 16 to the end that the mechanism can be operated cyclically and automatically controlled. The cranks 16 are rotated by suitable gearing 35 by means of a motor 36, the elements 35 and 36 providing the desired degree of speed reduction.

Feeding means are shown in Fig. 2 by means of which the containers 11 may be fed into operative position between the plates 12. The feeding means comprises a magazine 40, a rotatably mounted feed wheel 41 having pockets 42, and a discharge chute 43. Suitable operating means are provided to index the feed wheel 41 through 90°, so that one of the containers 11a disposed within the magazine 40 may be fed into operative position. At the same time the spent container 11b is discharged into chute 43.

The shaft of one of the cranks 16 may be extended to provide a cam shaft 45 for actuating suitable control mechanism 46. The control mechanism controls the motor 36 to operate in successive half cycles, to open and close the valve (not shown) in inlet conduit 23 (when the parts are in the Fig. 3 position), and to index the feed wheel 41 between successive cycles of operation of the extractor 10.

A modified form of perforating pin 47 is shown in Fig. 6 in which the pin 47 is hollow and may be connected directly to the nipple 14.

The recesses in the perforating surfaces are therefore in the form of narrow slots 48 which provide communicating passageways between the interior of the container 11 and the interior of the nipple 14.

According to this modification, the seal between the end walls 19 of the container and the plates 12 may be effected in either one of two ways. According to one method the seal may be between the gasket 15 and the bead 20 as pointed out in connection with Fig. 3. According to the other method, the seal may be effected directly between the gasket 15' and the end wall 19, thus dispensing with the header chambers 21 and 22. According to the latter method, the dimensions of the gasket 15' and the plate 12' are less than the diameter of the container 11, or else the plates 12' are otherwise relieved at their outer portions to permit the gasket 15' to make physical and sealing contact with the end wall 19 in the area which immediately surrounds the perforating pin 47.

The modified form of construction is preferred in situations wherein there is any possibility that the beads 20 will be dented or otherwise deformed, since such deformation of the bead will interfere with the proper sealing action in the Fig. 3 type of construction. If more than one perforating pin 47 is mounted on a plate 12, a separate nipple 14 is provided for each perforating pin 47 and the inlet or outlet conduits 23 or 24, as the case may be, or both, are suitably branched.

To summarize the operation, which has previously been detailed in connection with the description of the various parts and assemblies, after the magazine 40 is loaded with containers 11a, and the feed wheel 40 indexed to bring one of those containers 11 into operative position, the mechanism is prepared for the first cycle of operation. The cycle of operation takes place in two half cycles as indicated above. On the first half cycle, the end walls 19 are perforated, and a suitable seal is automatically effected between the inlet conduit 23 and one end of the container 11, and between outlet conduit 24, and the other end of the continer 11. This seal is provided by the gasket 15 which contacts either the bead 20 or the end wall 19. Then the control mechanism 46 first opens and then closes the valve so that a predetermined quantity of hot water may pass through the container 11. The motor 36 then operates through its second half cycle to retract the perforating pins 13 or 47, and then the feed wheel 41 is indexed through 90° to discharge the spent container 11b and to bring a fresh container 11a into operative position.

The interval between the first and second half cycles may be determined by either suitable timing mechanism or by means of a high level water level switch in the reservoir. The harmonic motion provided by the cranks 16 together with the resilient mounting of the perforating plates 12 permits sufficient movement of the cam shaft 45 to operate the valve cam without breaking the seal. The beginning of the first half cycle may also be initiated automatically, as by the provision of a low level water level switch in the reservoir.

Thus, according to the present invention it is possible to provide freshly brewed coffee, in the sense that the extraction is effected without exposing the coffee bean to the oxidizing action of the air for any appreciable length of time subsequent to the grinding of the bean. In other words, immediately after grinding, the ground coffee bean is sealed in a metal can of the "vacuum type" according to the usual practice. Then, without further exposing the ground coffee to the atmosphere, the coffee within the container or can is extracted, the concentration being determined by the quantity of hot water which is forced through the ground coffee within the container. There is no problem of grounds disposal because at the conclusion of the extracting operation, the grounds remain within the container, and the container is merely discarded. Furthermore, it has been found that there is no substantial amount of free liquid within the container at the conclusion of the operation, since the coffee grounds absorb most of the liquid remaining in the interstices of the coffee grounds, and the remainder is apparently dissipated by evaporation almost instantaneously due to the elevated temperature of the water and the materials surrounding the same. Thus, the spent containers 11b, which collect in a suitable receptacle below a discharge chute 43, are not resting in a puddle of water which would cause objectionable odors. As a matter of fact, since the only contact between the spent grounds and the atmosphere is restricted to the relatively small area adjacent each of the relatively few perforations in the container, there is practically no disagreeable odor whatsoever with the result that the present invention is particularly well adapted for use in automatic coffee vending machines which are able to be serviced only at intervals of one or two days.

Although only preferred embodiments of our invention have been shown and described herein, it will be understood that various modifications and changes may be made in the construction without departing from the spirit of our invention as pointed out in the appended claims.

We claim:

1. Apparatus for making coffee or the like comprising a pair of oppositely disposed plates, a sealed coffee can having beaded ends and disposed between said plates and containing the ground coffee to be extracted, means for urging said plates toward each other to engage the beads of said coffee can located therebetween, gasket means carried on said plates to provide a seal between said plates and said can, a perforating pin carried by each plate for making perforations in the opposite end walls of said can prior to the time that sealing engagement is effected between said beads and said plates, said perforations providing communication between the interior of said can, a source of hot water and a reservoir, whereby hot water may be forced through said can from said source and into said reservoir and whereby the coffee may be extracted from the ground coffee disposed within said can, said sealed coffee can constituting a rigid structure which cooperates with said gasket means to form fluid tight seals whereby all of the hot water passing through said inlet conduit will be utilized in the extracting operation and delivered to said reservoir, said plate urging means being operative to maintain the perforating pin on the reservoir side of said can in said perforation during the extraction process so that the space between said pin and the material of said end wall will constitute a restricted opening which cooperates with the particulate material within said coffee can to provide a filtering action.

2. Apparatus for making coffee comprising a pair of oppositely disposed plates, a sealed coffee can having beaded ends and disposed between said plates and containing the ground coffee to be extracted, means for urging said plates toward each other to engage the beads of said coffee can located therebetween, gasket means carried on said plates to provide a seal between said plates and said beads, a perforating pin carried by each plate for perforating the opposite end walls of said can prior to the time that sealing engagement is effected between said beads and said end plates, said perforating pins each having a recess in a perforating surface to provide communication between a sealed header chamber comprising said plate, the end wall of said can, and said bead, on the one hand, and the interior of said can on the other, means providing communication between one of said chambers and a source of hot water, and means providing communication between the other of said chambers and a reservoir, whereby hot water may be forced through said chambers and said can from said source and into said reservoir and whereby the coffee may be extracted from the ground coffee disposed within said can.

3. Apparatus as claimed in claim 2 in which said recess is smaller than the average grain size of said ground coffee so that the grounds will be retained within said can.

4. Apparatus for making coffee or the like comprising means providing a fluid circuit and including two conduits, an inlet conduit and an outlet conduit, and extractor means disposed between said conduits, said extractor means comprising a pair of perforating plates, a cylindrical sealed container disposed between said plates and containing the particulate material to be extracted, perforating pins carried by each of said plates for making perforations in the opposite end walls of said container, means providing communication between each conduit and the interior of said container, said communication providing means including a relieved portion in a piercing surface of a perforating pin to provide a predetermined clearance between said piercing surface and the extruded metal of the end wall on the outlet side of said container to facilitate filtering, gasket means carried by said perforating plates for effecting a seal between each of said perforating plates and the corresponding end of said container whereby the interior of said container will form a part of said fluid circuit, a backing plate for each perforating plate, means for resiliently mounting each perforating plate on one of said backing plates, and actuating mechanism connected to said backing plates for moving said backing plates toward each other so that the end walls of said container disposed between said perforating plates will be pierced by said perforating pins and for maintaining said perforating pins in said perforations during the extracting operation to maintain said predetermined clearance, said resilient mounting means serving to maintain said perforating plates in operative position during the extracting operation irrespective of slight variations in the position of said actuating mechanism.

5. Apparatus for making coffee or the like by pressure extraction comprising means providing a fluid circuit and including a source of hot water, a value therefor, an inlet conduit, an outlet conduit, and pressure extractor means, said extractor means comprising two perforating means, and a hermetically sealed sheet metal coffee container containing the ground coffee to be extracted and disposed adjacent said perforating means, each perforating means including a hollow perforating pin extending toward a wall portion of said coffee container for piercing same, actuating mechanism for moving said perforating means toward said container so that said coffee container will be pierced by said perforating pins at two points, means providing communication between each conduit and an associated perforating pin, gasket means carried by said perforating means for effecting a seal between each of said perforating means and said coffee container which is pierced thereby whereby the interior of said container will form a part of said fluid circuit, said sealed coffee container constituting a rigid structure and the pierced wall portions thereof reacting against said gasket means to form a fluid tight seal to avoid the use of a separate extraction chamber means for operating said valve, whereby said coffee container may be included in and removed from said fluid circuit by the piercing operation, the hollow perforating pin associated with said outlet conduit embodying means providing a plurality of passageways of a size smaller than the average size of the ground coffee particles disposed within said container so that said ground coffee particles provide a filter bed for the extract.

6. Apparatus for making coffee or the like by pressure extraction comprising means providing a fluid circuit and including a source of hot water, a valve therefor, an inlet conduit, an outlet conduit, and pressure extractor means, said extractor means comprising two hollow perforating pins each having openings in its surface communicating with the hollow interior thereof, and one of a series of hermetically sealed sheet metal coffee containers containing the ground coffee to be extracted, means for feeding said containers successively into a position adjacent said perforating pins with said pins extending toward a coffee container so positioned, actuating mechanism for said perforating pins so that said coffee container will be pierced by said perforating pins at two points, means providing communication between each conduit and an associated perforating pin, gasket means carried by said perforating pins for effecting a seal between each of said perforating pins and that surrounding wall portion of said coffee container which is pierced thereby, and means for operating said valve, whereby the interior of said container will form a part of said fluid circuit, said sealed coffee container constituting a rigid structure and the said surrounding wall portions reacting against said gasket means to form fluid tight seals, said sealed container itself serving as a sealed extraction chamber whereby all of the hot water passing through said inlet conduit will be utilized in the extracting operation and be delivered under pressure into said outlet conduit without the use of other sealing means so that said coffee container may be included in and removed from said fluid circuit by the piercing operation, the minimum dimensions of the said openings in the perforating pin associated with said outlet conduit being of a size smaller than the average size of the ground coffee particles disposed within said container so that said ground coffee particles provide a filter bed for the extract.

7. Apparatus for making coffee or the like by pressure extraction comprising means providing a fluid circuit and including a source of hot water, a storage reservoir, an inlet conduit leading from said source of hot water, a valve located in said inlet conduit to control the flow of hot water therethrough, an outlet conduit leading to said storage reservoir, and pressure extractor means, said extractor means comprising two perforating means, and one of a series of hermetically sealed sheet metal coffee containers containing the ground coffee to be extracted, means for feeding said containers successively into a position adjacent said perforating means, each perforating means including a perforating pin extending toward a wall portion of a coffee container so positioned for piercing same, actuating mechanism for moving said perforating means toward said container so that said coffee container will be pierced by said perforating pins at two points, means providing communication between each conduit and an associated perforating pin, gasket means carried by said perforating means for effecting a seal between each of said perforating means and said coffee container which is pierced thereby, and means for operating said valve, whereby the interior of said container will form a part of said fluid circuit, said sealed coffee container constituting a rigid structure and the pierced wall portions thereof reacting against said gasket means to form a fluid tight seal to avoid the use of a separate extraction chamber, said coffee container being included in and removed from said fluid circuit by the piercing operation, the perforating pin associated with said outlet conduit embodying means providing a plurality of passageways of a size smaller than the average size of the ground coffee particles disposed within said container so that said ground coffee particles provide a filter bed for the extract, said actuating mechanism and said container feeding means being operative to retract said piercing pins from said container and to discharge the spent container at the conclusion of the extracting operation.

8. Apparatus as claimed in claim 7 in which said perforating pins are hollow, said passageway providing means comprising openings in the surface of said outlet pin which communicate with the hollow interior thereof, and in which said gasket means surround said perforating pins for engagement with those portions of said coffee container which immediately surround said perforating pins whereby all of the hot water passing through said inlet conduit will be utilized in the extracting operation, and whereby all of the coffee extract may be delivered under pressure to said reservoir.

References Cited in the file of this patent

UNITED STATES PATENTS

| | | |
|---|---|---|
| 1,083,900 | Brown | Jan. 6, 1914 |
| 1,377,316 | Clermont | May 10, 1921 |
| 1,887,592 | Goodfellow | Nov. 15, 1932 |
| 2,451,195 | Brown | Oct. 12, 1948 |
| 2,514,596 | Crossley et al. | July 11, 1950 |
| 2,596,432 | Pietzsch | May 13, 1952 |
| 2,618,407 | Thorn | Nov. 18, 1952 |
| 2,629,663 | Fogler et al. | Feb. 24, 1953 |
| 2,710,115 | Chandler | June 7, 1955 |
| 2,765,005 | Wellekens | Oct. 2, 1956 |
| 2,778,739 | Rodth | Jan. 22, 1957 |
| 2,899,886 | Rodth | Aug. 18, 1959 |

FOREIGN PATENTS

| | | |
|---|---|---|
| 535,172 | Great Britain | Apr. 1, 1941 |

UNITED STATES PATENT OFFICE
CERTIFICATE OF CORRECTION

Patent No. 2,952,202            September 13, 1960

Frank J. Renner et al.

It is hereby certified that error appears in the printed specification of the above numbered patent requiring correction and that the said Letters Patent should read as corrected below.

Column 6, line 38, for "value" read -- valve --; line 58, after "chamber" insert -- , and --.

Signed and sealed this 4th day of April 1961.

(SEAL)
Attest: ERNEST W. SWIDER

Attesting Officer

ARTHUR W. CROCKER
Acting Commissioner of Patents